Sept. 22, 1959 J. M. KLEINMAN 2,905,819
LINEAR SAWTOOTH WAVE GENERATOR
Filed March 24, 1958
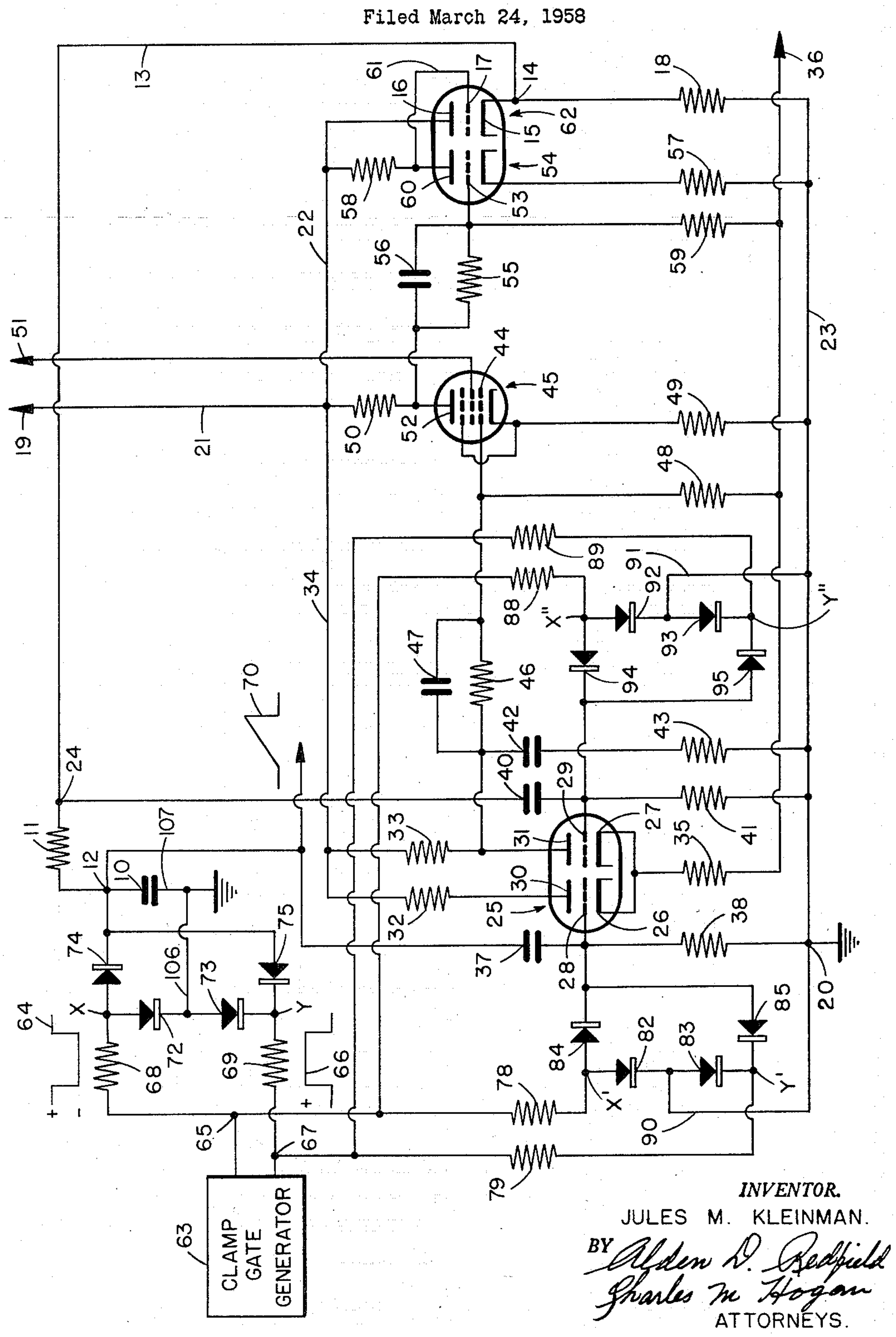
INVENTOR.
JULES M. KLEINMAN.
BY Alden D. Redfield
Charles M. Hogan
ATTORNEYS.

2,905,819
Patented Sept. 22, 1959

2,905,819

LINEAR SAWTOOTH WAVE GENERATOR

Jules M. Kleinman, Loveland, Ohio, assignor to Avco Manufacturing Corporation, Cincinnati, Ohio, a corporation of Delaware Application March 24, 1958, Serial No. 723,531

13 Claims. (Cl. 250—27)

The present invention relates to sweep circuits, and particularly to an improved bootstrap sawtooth voltage generator the wave form of which is precisely linear.

The principal object of the invention is to provide a bootstrap sawtooth generator characterized by a precisely linear voltage ramp which is automatically maintained.

Another object of the invention is to provide a sawtooth generator which is characterized by extremely rapid flyback or retrace.

A further significant object of the invention is to provide a sawtooth generator in which residual gate pulse effects occurring in prior art devices during retrace are cancelled out.

It is also an object of the invention to provide a circuit of the character described which offers the advantages of extreme stability and high feedback loop gain, the feedback loop being essentially resistive.

Still a further object of the invention is to provide a circuit in which the sweep capacitor is conductively connected in circuit with the cathode resistor of the cathode follower stage, so that a coupling capacitor in this circuit can be dispensed with.

In accordance with the invention there is provided a generator of linear wave forms comprising a capacitor adapted to be charged on trace and discharged during retrace, a charging resistor in circuit with said capacitor, means including a source of current and an active device in circuit with said charging resistor for producing and controlling current flow through said resistor, said active device having a control element, means for sampling the wave forms at spaced points on said charging resistor and differentially combining the sampled wave forms to derive a resultant wave form, and means for applying said resultant wave form to the control element of said active device to render linear the trace portion of the output wave form of said capacitor.

The equation for the amplitude of the sawtooth output of the generator in accordance with the invention is identical to the equation for the Miller sweep, said equation being numbered (7–7) at page 216 of the text "Pulse and Digital Circuits," by Millman and Taub, McGraw-Hill Book Co., Inc., New York, 1956. Bearing in mind the high gain effected by the present invention, such equation shows that the percentage of non-linearity of the ramp voltage produced thereby is extremely low. The departure from the ideal ramp function is 0.0175% in one practical embodiment of the present invention.

A significant advantage of the present invention is the elimination of the feedback capacitor (which is conventionally used in bootstrap circuits). This step substantially reduces the non-linearity and reference level offset effects caused by slight variations in the charge acquired by this capacitor during successive retrace intervals.

The symmetrically balanced-clamped bootstrap sawtooth generator in accordance with the invention enjoys an advantage over the conventional Miller sawtooth generator, in that the invention permits the direct grounding of one end of the charging capacitor. In the operation of the invention the clamping action is initiated at a substantial sawtooth voltage level—a level large in magnitude by comparison with the variation among diodes of the same rating, so that rated clamping diode currents can be maintained in a manner minimizing clamping diode reference level offset effects during retrace.

For a better understanding of the invention, together with other and further advantages, objects, and capabilities thereof, reference is made to the following description of the accompanying drawing, the single figure of which is a circuit schematic of a preferred embodiment of the invention, which was reduced to practice and found to be satisfactorily operable.

Referring now to the single figure of the drawing, there is shown a sweep capacitor 10. In common with many sweep circuits, the invention operates in such a way as to charge sweep capacitor 10 during trace and to discharge that capacitor during retrace. In accordance with the invention, charging and discharging circuits, both of novel character, are provided, and these are arranged in a novel combination with such sweep capacitor.

Referring first to the charging circuit for sweep capacitor 10, it comprises a charging resistor 11, one terminal of which is connected to terminal 12 of the capacitor, and the other terminal 24 of which is connected, via conductor 13, to a point of positive potential 14. Point 14 is at the same potential as cathode 15 of a cathode follower stage 62 comprising anode 16, control electrode 17, cathode resistor 18, and a suitable source of high potential (not shown), the positive terminal of which is indicated symbolically at 19. The anode-cathode output circuit of the cathode follower is serially connected between terminal 19 and ground 20. That is to say, a series circuit is traced through terminal 19, conductor 21, conductor 22, anode 16, cathode 15, point 14, cathode resistor 18, conductor 23, and ground 20. During trace capacitor 10 charges linearly toward the voltage at point 14, and this charging voltage is controlled by the cathode follower stage, which in turn is controlled, via its control electrode 17, by the error signal network now described.

A linear trace—i.e., constant charging current across resistor 11 and resultant output waveform 70—is assured when both terminals 12 and 24 of the charging resistor 11 rise in potential by substantially the same amount. This objective is accomplished in the present invention by sampling the sawtooth waves at both terminals 12 and 24 of charging resistor 11, then applying both samples to a difference amplifier 25 to maintain a continuous measurement during trace of the difference between them (that is to say, differentially combining the two sawtooth samples), then amplifying the resultant error signal, and finally utilizing the amplified error signal, as applied to control electrode 17, in such a way as substantially to equate the rises in voltage at terminals 12 and 24.

To this end, there is provided a difference amplifier unit 25 having directly coupled cathodes 26 and 27, control electrodes 28 and 29, and anodes 30 and 31. The anodes are connected to terminal 19 of the source of space current by separate load resistors 32 and 33 and common conductors 34 and 21. Common cathode resistor 35 is connected between the junction of cathodes 26 and 27 and negative terminal 36 of a suitable source of bias potential (not shown).

Having described the bias arrangements for the difference amplifier stage 25, I now make reference to the networks which are utilized to sample the sawtooth signals at terminals 12 and 24 of charging resistor 11 and to apply them to the difference amplifier 25. Specifically, terminal 12 of charging resistor 11 is coupled to control electrode 28 of the difference amplifier by a network comprising series coupling capacitor 37 and grid resistor 38, the latter being connected between control electrode 28 and ground 20. Similarly, terminal 24 is coupled to control electrode 29 by a network comprising series coupling capacitor 40 and grid resistor 41, the latter being connected between control electrode 29 and ground.

The error signal output appears at anode 31 of the difference amplifier, and this wave is amplified by two cascaded stages before application to control electrode 17 of the cathode follower. In order to prevent oscillations, an error signal network being essentially a regenerative feedback system, a filter network comprising serially related capacitor 42 and resistor 43 is connected between anode 31 and ground 20. Signal output anode 31 is coupled to the control electrode 44 of amplifying stage 45 by a high-frequency compensated direct coupling network comprising divider resistor 46 and speed-up capacitor 47, the latter two elements being arranged in parallel. Fixed negative bias is applied to control electrode 44 by the interposition of grid resistor 48 between such control electrode and the negative biasing terminal 36.

Stage 45 comprises a pentode and suitable bias connections. That is, cathode resistor 49 is connected between its cathode and ground, dropping resistor 50 is connected between its anode and the positive terminal 19 of the space current source, the suppressor is connected to the cathode, and the screen grid is connected to the positive terminal 51 of a suitable source of screen voltage (not shown).

The anode 52 of amplifying stage 45 is coupled to the control electrode 53 of the second amplifying stage 54 by a direct coupling network comprising divider resistor 55 and speed-up capacitor 56, the latter two elements being connected in parallel. Amplifying stage 54 has a cathode resistor 57, connected between cathode and ground, and an anode dropping resistor 58, connected between the anode and positive terminal 19. Again, a grid resistor 59 is interposed between control electrode 53 and the negative bias terminal 36. Anode 60 of the second amplifier stage 54 is directly connected by conductor 61 to the control electrode 17 of the cathode follower stage 62. It will be seen that the stages 25, 45, and 54 comprise means for differentially combining the sawtooth samples at the two terminals of charging resistor 11, amplifying the resultant difference, and applying such resultant to the cathode follower stage 62, which operates in such a way as to control the voltage at point 14.

The switch clamps 82–85 and 92–95 return control electrodes 28 and 29 to ground during retrace, to insure that the sampled sawtooth wave forms on such electrodes start from ground potential.

The description now proceeds to a discussion of the source of gating pulses and the relationship of said source to the remainder of the system.

At the input of the system there is provided a clamp gate generator 63 which produces positive-to-negative going gate pulses of wave form 64 at terminal 65 and negative-to-positive going gate pulses 66 at terminal 67. The two gate pulses are symmetrical. In the preferred embodiment the absolute magnitude of the positive level of the negative clamping gate pulses 64 is exactly equal to the absolute magnitude of the negative level of the positive clamping gate pulses 66. Output terminals 65 and 67 of the clamp gate generator are connected to isolating resistors 68 and 69, respectively. The wave form at point X is clamped to ground by a negative clamping circuit comprising diode 72, having its anode connected to resistor 68 and its cathode connected to ground. The wave form at point Y is clamped to ground by a positive clamping circuit comprising diode 73, the cathode of which is connected to resistor 69 and the anode of which is connected to ground. Because of these connections of diodes 72 and 73, points X and Y instantly return to ground potential on the termination of each symmetrical gating pulse pair. In other words, points X and Y are at ground potential during retrace or flyback.

A quick discharge path for sweep capacitor 10 is provided by diode 75, which has its anode connected to terminal 12 and its cathode connected to point Y (effectively grounded during retrace). The last-mentioned diode 75 is conductive during retrace and is rendered non-conductive during trace by the application of gating pulse 66 to its cathode. Provision is made for the quick discharge of sweep capacitor 10, in the event it is charged with opposite polarity, by the diode 74, which has its cathode connected to terminal 12 and its anode connected to point X. Diode 74 is rendered non-conductive during trace by the application of gating pulse 64 to its anode.

In the interest of clarity, point X is the junction of resistor 68 and the anodes of diodes 72 and 74. Point Y is the junction of resistor 69 and the cathodes of diodes 73 and 75. The junction of the cathode of diode 72 and the anode of diode 73 is connected to ground by conductor 106, and the sweep capacitor is connected to ground by conductor 107.

In order to bring grids 28 and 29 of the difference amplifier rapidly to ground potential during retrace and to keep them at ground potential, there are provided diode switch clamps 82, 83, 84, 85, and 92, 93, 94, and 95, respectively associated with these control electrodes. That is to say, the clamp gate pulse 64 drives grids 28 and 29 through isolating resistors 78 and 88, respectively, and clamp gate pulse 66 drives these grids through isolating resistors 79 and 89, respectively. In each instance there are provided negative clamping diodes 82 and 92, corresponding to diode 72, and positive clamping diodes 83 and 93, corresponding to diode 73. There are further provided series diodes 84 and 94, corresponding to diode 74, and diodes 85 and 95, corresponding to diode 75.

The junction of diodes 82 and 83 is connected to ground by conductor 90. The junction of diodes 92 and 93 is connected to ground by conductor 91. The junction of diodes 84 and 85 is connected to control electrode 28. The junction of diodes 94 and 95 is connected to control electrode 29. Point X′ corresponds to point X and is the junction of the anodes of diodes 82 and 84. Point Y′ corresponds to point Y and is the junction of the cathodes of diodes 83 and 85. Point X″ corresponds to point X and is the junction of the anodes of diodes 92 and 94. Point Y″ corresponds to point Y and is the junction of the cathodes of diodes 93 and 95. The output of the sweep capacitor is taken at point 12.

The gate pulses 64 and 66 drive the diode switch clamps 72, 73, 74, and 75 through isolating resistors 68 and 69, respectively. During application of gate pulse 64, diode switch clamps 72 and 74 are rendered non-conducting. During this same interval positive gate pulse 66 is being applied, rendering diode switch clamps 73 and 75 non-conducting. Therefore sawtooth-forming sweep capacitor 10 starts to charge toward the positive voltage existing at point 14 and continues such charge during the trace period (i.e., throughout the duration of the gate pulses 64 and 66).

The rising voltage at terminal 12 is R.C. coupled via the long time-constant network of capacitor 37 and grid resistor 38 to grid 28 of the differential amplifier 25. Since a positive feedback loop consisting of differential amplifier 25, pentode amplifier 45, triode amplifier 54, and cathode follower 62 exists from the bottom end 12 of charging resistor 11 through the feedback loop to the top end 24 of the charging resistor, a rising voltage will also appear at the top end 24 of the charging resistor. This rising voltage is R.C. coupled via capacitor 40 and grid resistor 41 to the other control grid 29 of the differential amplifier 25.

Gated clamping diode sets 82, 83, 84, and 85 and 92, 93, 94, and 95 are provided between the two control grids 28 and 29 and ground to insure that these grids will be rapidly clamped to ground potential during each intersweep period.

Since the gain of the feedback amplifier loop is finite, the sawtooth voltage appearing at the top end 24 of the charging resistor 11 will be slightly less than the sawtooth voltage appearing at the bottom end 12 of the charging resistor. The sawtooth amplitude appearing at control grid 29 will, therefore, be slightly less than the sawtooth amplitude appearing at control grid 28 of differential amplifier 25. A positive sawtooth will appear at the plate 31 of differential amplifier 25 which is exactly equal to the difference between the two sawtooth voltages appearing at the control grids 28 and 29 multiplied by the gain of differential amplifier 25. The resultant positive-going differential (or error signal) is D.C. coupled via coupling network 46, 47, 48 to control grid 44 of pentode amplifier 45. A negative-going and amplified differential signal appears at the plate 52 of this stage and is D.C. coupled through coupling network 55, 56, 59 to the control grid 53 of the triode amplifier 54.

The low pass filter network 42, 43 is employed between the plate 31 of the difference amplifier 25 and ground to provide the proper high frequency roll-off characteristic for the feedback amplifier loop.

An amplified positive-going differential signal appears at the plate 60 of triode amplifier 54 and is directly applied to the control grid 17 of cathode follower 62. The direct connection between plate 60 of triode amplifier 54 and control grid 17 of cathode follower 62 is utilized to establish the proper quiescent source voltage at the cathode 15 for the sawtooth forming capacitor 10. The fact that the bootstrapping voltage is derived by means of direct connection (conductor 13) to the cathode 15 of the cathode follower 62, which is a low impedance and essentially resistive source, enhances optimum feedback conditions.

When negative clamping gate 64 ends and goes to its positive level and positive clamping gate 66 ends and goes to its negative level, the four diode switch clamps 72, 73, 74, and 75 all conduct and rapidly discharge the sawtooth forming capacitor 10. Since the two gate levels are equal and opposite, no residual gate is left to which the sawtooth forming capacitor 10 can tend to charge toward; therefore no offset will be prevalent during the intersweep or retrace periods. At the same time as the sawtooth forming capacitor 10 is being discharged, the control grids 28 and 29 of the differential amplifier 25 are rapidly being clamped to zero or ground potential, and remain at this potential for the entire intersweep or retrace period, thereby minimizing D.C. offset through the positive feedback loop. A positive linear sawtooth output voltage 70 is obtained at the top end of sawtooth forming capacitor 10.

The following illustrative parameters have been found to be suitable in one practical embodiment of the invention:

Resistors:

| | | |
|---|---|---|
| **11** | megohms | 2.2 |
| **18** | ohms | 56,000 |
| **32** | do | 150,000 |
| **33** | do | 150,000 |
| **35** | do | 75,000 |
| **38** | megohms | 22 |
| **41** | do | 22 |
| **43** | ohms | 560 |
| **46** | megohm | 1 |
| **48** | do | 1 |
| **49** | ohms | 82 |
| **50** | do | 25,000 |
| **55** | megohm | 1 |
| **57** | ohms | 1,000 |
| **58** | do | 100,000 |
| **59** | megohm | 1 |
| **68** | ohms | 1,000 |

Resistors:

| | | |
|---|---|---|
| **69** | ohms | 1,000 |
| **78** | do | 1,000 |
| **79** | do | 1,000 |
| **88** | do | 1,000 |
| **89** | do | 1,000 |

Capacitors:

| | | |
|---|---|---|
| **10** | micromicrofarads | 680 |
| **37** | microfarad | 0.1 |
| **40** | do | 0.1 |
| **42** | do | 0.01 |
| **47** | micromicrofarads | 47 |
| **56** | do | 47 |

Tubes and diodes:

| | |
|---|---|
| **25** | Type 5755 |
| **45** | Type 6AH6 |
| **54, 62** | Type 5751 |
| Each of **72, 73, 74, 75, 82, 83, 84, 85, 92, 93, 94, 95** | Type 1N486-A |
| **95** | Type 1N486-A |

Voltages:

| | Volts |
|---|---|
| At **19** | +300 |
| At **36** | −150 |
| At **51** | +150 |

While there has been shown and described what is at present considered to be the preferred embodiment of the invention, it will be understood by those skilled in the art that various modifications and changes and substitutions of equivalents may be made therein without departing from the scope of the invention as defined by the appended claims.

I claim:

1. A generator of linear wave forms comprising a capacitor adapted to be charged on trace and discharged during retrace, a charging resistor in circuit with said capacitor, means including a source of current and an active vacuum tube device in circuit with said charging resistor for producing and controlling current flow through said resistor, said active device having a cathode and a control element, sawtooth-wave-comparing repeater means for sampling the wave forms at spaced points on said charging resistor and differentially combining the sampled wave forms to derive a resultant wave form, one of said points being directly connected to said cathode, and means for applying said resultant wave form to the control element of said active device to render linear the trace portion of the output wave form of said capacitor.

2. A generator of linear wave forms comprising a capacitor adapted to be charged on trace and discharged during retrace, a charging resistor in series with said capacitor, means including a source of current and a cathode follower device in circuit with said charging resistor for producing and controlling current flow through said charging resistor, said device having a cathode and a control element, sawtooth-wave-comparing repeater means including a difference amplifier for sampling the wave forms at the terminals of said charging resistor and differentially combining the sampled wave forms to derive a resultant wave form, one terminal of said resistor being directly connected to said cathode, and means for applying such resultant wave form to said control element to render constant the charging current through said charging resistor.

3. A generator in accordance with claim 2 in which the cathode follower device has a cathode resistor conductively connected in a direct current path to one terminal of said charging resistor.

4. A generator in accordance with claim 2, and means for amplifying the resultant wave form before applying it to said control element.

5. A generator of linear wave forms comprising a capacitor adapted to be charged on trace and discharged during retrace, diode electronic switch means for providing a quick discharge path for said capacitor, means for periodically rendering said path non-conductive, a fixed charging resistor in circuit with said capacitor, means including a source of current and an active device in circuit with said charging resistor for producing and controlling current flow through said resistor, said active device having a control element, sawtooth-wave-comparing repeater means for sampling the wave forms at spaced points on said charging resistor and differentially combining the sampled wave forms to derive a resultant wave form, and means for applying such resultant wave form to the control element of said active device to render linear the trace portion of the output wave form of said capacitor.

6. A generator in accordance with claim 5 wherein the means for periodically rendering the discharge path non-conductive comprises a clamp gate generator for generating symmetrical and balanced pulses of opposite polarity such that the absolute magnitude of the negative level of the positive pulse is equal to the absolute magnitude of the positive level of the negative pulse, whereby said capacitor charges linearly during application of said pulses to the electronic switch means but discharges rapidly through the switch means in retrace intervals between said pulses, effectively without residual offset effects.

7. A generator in accordance with claim 6 wherein the clamp gate generator has two outputs and wherein the electronic switch means comprises switching diodes in series between said outputs and one terminal of said capacitor and oppositely poled to be rendered non-conductive by said pulses, together with clamping diodes connected in shunt between said outputs and a point of reference potential and poled to be rendered conductive during intervals between said pulses, said capacitor having one terminal connected to said point of reference potential and a second terminal connected to both of said switching diodes.

8. A generator in accordance with claim 7, and isolating resistors between said outputs and the switching diodes.

9. A generator in accordance with claim 8, in which the negative going pulse output of the clamp gate generator is supplied to the anode of one switching diode and anode of one clamping diode to render both diodes non-conductive during trace and in which the positive going output of the clamp gate generator is applied to the cathode of the other switching diode and the cathode of the other clamping diode to render the latter two diodes non-conductive during trace, the first clamping diode functioning as a negative clamper and the second clamping diode functioning as a positive clamper to clamp both outputs to said reference potential.

10. A generator of linear wave forms comprising a capacitor having two terminals and adapted to be charged on trace and discharged during retrace, a charging resistor in circuit with said capacitor, means including a source of current and an active device in circuit with said charging resistor for producing and controlling current flow through said resistor, said active device having a control element, means for sampling the wave forms at the terminals of said charging resistor and differentially combining the sampled wave forms to derive a resultant wave form, means for applying said resultant wave form to the control element of said active device to render linear the trace portion of the output wave form of said capacitor, means having two outputs for producing symmetrical and balanced gate pulses for controlling the duration of trace, symmetrical clamps between said outputs and one terminal of said capacitor for clamping the base lines of said pulses to the reference voltage level of said one terminal, and oppositely poled gates between said outputs and the other terminal of said capacitor, the gates and clamps being rendered non-conductive by application of said pulses.

11. A generator of linear wave forms comprising a capacitance adapted to be charged on trace and discharged during retrace, a fixed charging resistance in circuit with said capacitor, charging means for producing a current flow through said resistor, sawtooth-wave-comparing repeater means having two control electrodes coupled to spaced points on said charging resistor for sampling the wave forms at such spaced points on said charging resistor and comparing the sampled wave forms to derive a resultant wave form, and means for applying such resultant wave form to the charging means to control said current flow.

12. A linear form sweep system comprising, in combination, a gate pulse generator for producing symmetrical pulses of opposite polarity, said generator having two outputs, a first diode switch clamp circuit comprising switching diodes in series with said outputs and poled to be rendered non-conductive by said pulses together with clamping diodes separately connected in shunt between a point of reference potential and said outputs and poled to be rendered non-conductive by said pulses, a sweep capacitor having one terminal connected to said point of reference potential and a second terminal connected to both of said switching diodes, a cathode follower stage having a cathode resistor and anode and cathode and control electrodes, a source of space current having positive and negative terminals in circuit with the anode and cathode resistor of said stage, a charging resistor directly connected between the second terminal of the sweep capacitor and the cathode of the cathode follower, whereby said capacitor charges linearly toward the voltage at said cathode during application of said gate pulses to the first diode switch clamp circuit but discharges rapidly through the first switch clamp circuit in retrace intervals between said pulses, and means for maintaining constant the charging current through said charging resistor comprising: means including a difference amplifier for sampling the sawtooth wave forms at the terminals of said charging resistor and differentially combining them to derive a resultant error sawtooth, said difference amplifier comprising a tube having two anodes, coupled cathodes and a pair of control electrodes and series-capacitor, grid resistor couplings between said terminals and said control electrodes, a second diode switch clamp circuit similar to the first and coupled between said outputs and one control electrode circuit of the difference amplifier, a third switch clamp circuit similar to the first and second and coupled between said outputs and the other control electrode circuit of the difference amplifier, and means for amplifying such error sawtooth and applying the amplified error sawtooth to the control electrode of the cathode follower stage to control the potential at the cathode of that stage so that the charging current is maintained constant, said second and third switch clamp circuits maintaining the control electrodes of the difference amplifier at said reference potential during retrace periods.

13. A linear form sweep system comprising, in combination: a gate pulse generator for producing symmetrical pulses of opposite polarity, said generator having two outputs, a first diode switch clamp circuit comprising switching diodes in series with said outputs and poled to be rendered non-conductive by said pulses together with clamping diodes separately connected in shunt between a point of reference potential and said outputs and poled to be rendered non-conductive by said pulses, a sweep capacitor having one terminal connected to said point of reference potential and a second terminal connected to both of said switching diodes, means including a source of current and a charging resistor and an active device in circuit with said charging resistor for producing and controlling current flow through said charging resistor, said active device having a control element and a cathode, whereby said capacitor charges linearly toward the voltage at said cathode during application of said gate pulses to the first diode switch clamp circuit but discharges rapidly through the first switch clamp circuit in retrace intervals between said pulses, and means for maintaining constant the charging current through said charging resistor comprising: means including a difference amplifier for sampling the sawtooth wave forms at the terminals of said charging resistor and differentially combining them to derive a resultant error sawtooth, said difference amplifier comprising a tube having two anodes, coupled cathodes and a pair of control electrodes and series-capacitor, grid resistor couplings between said terminals and said control electrodes, a second diode switch clamp circuit similar to the first and coupled between said outputs and one control electrode circuit of the difference amplifier, a third switch clamp circuit similar to the first and second and coupled between said outputs and the other control electrode circuit of the difference amplifier, and means for applying the amplified error sawtooth to the control element of the active device to maintain constant the charging current, said second and third switch clamp circuits maintaining the control electrodes of the difference amplifier at said reference potential during retrace periods.

References Cited in the file of this patent

UNITED STATES PATENTS

| | | |
|---|---|---|
| 2,576,339 | Gray | Nov. 27, 1951 |
| 2,661,420 | Woodruff | Dec. 1, 1953 |